United States Patent [19]
Gayhart, Jr.

[11] Patent Number: 5,438,735
[45] Date of Patent: Aug. 8, 1995

[54] SLOT AND TONGUE S-CONNECTOR FOR ALIGNING AND CLAMPING A SERIES OF TUBES IN PARALLEL

[75] Inventor: Edward E. Gayhart, Jr., North Canton, Ohio

[73] Assignee: The Babcock & Wilcox Company, New Orleans, La.

[21] Appl. No.: 112,168

[22] Filed: Aug. 26, 1993

[51] Int. Cl.⁶ .............................................. A44B 21/00
[52] U.S. Cl. ...................................... 24/335; 24/339; 24/459
[58] Field of Search ................. 248/68.1, 223.4, 224.4; 138/111, 112; 24/335, 339, 459

[56] References Cited

U.S. PATENT DOCUMENTS

| 1,262,763 | 4/1918 | Farley | 248/68.1 X |
| 1,376,284 | 4/1921 | Kohn | 248/68.1 |
| 2,236,882 | 4/1941 | Vorkauf | 248/68.1 |
| 2,651,026 | 9/1953 | Roth | 24/335 X |
| 4,344,480 | 8/1982 | Boyer et al. | 248/68.1 X |

FOREIGN PATENT DOCUMENTS

| 163097 | 5/1949 | Austria | 248/68.1 |
| 772848 | 11/1934 | France | 24/339 |
| 3033790 | 4/1982 | Germany | 248/68.1 |
| 120636 | 1/1948 | Sweden | 248/68.1 |

Primary Examiner—James R. Brittain
Attorney, Agent, or Firm—Daniel S. Kalka; Robert J. Edwards

[57] ABSTRACT

A connector for use in series for aligning and clamping a series of tubes includes a member having a first recess near one end and a second recess near an opposite end. The first recess is located on one side of the member and the second recess is located on an opposite side of the member. The member also has a slot between the first recess and the second recess. The first recess of the member receives one tube and the second recess receives another tube.

2 Claims, 4 Drawing Sheets

SLOT AND TONGUE S-CONNECTOR FOR ALIGNING AND CLAMPING A SERIES OF TUBES IN PARALLEL

BACKGROUND OF THE INVENTION

1. Field of the Invention

The present invention relates in general to boiler tubes and, in particular, to a new and useful device and method for aligning and clamping a series of boiler tubes in parallel.

2. Description of the Related Art

In the power plant field, there are several known devices and methods which are used for clamping a series of boiler tubes. One known device uses two bar halves wherein each bar half comprises a plurality of recesses which are aligned and adjoined around a plurality of boiler tubes. The bar halves have aligned apertures for receiving a bolt, which is in turn, secured to a backing plate at one side of one of the bar halves.

A second known device uses bar halves which are a split ring casting having pins and holes. The pins of one bar half are fitted and aligned in the holes of a second bar half.

U.S. Pat. No. 5,083,372 to Polutnik, et al. also discloses a device for clamping tubes in parallel having two bar halves which are aligned and bolted to each other.

Presently, there is no known device or method for aligning and clamping a series of boiler tubes which is simple in design, rugged in construction and cost-efficient.

SUMMARY OF THE INVENTION

The present invention is a connector for use in series for aligning and clamping a series of tubes. The connector comprises a member having a first recess near one end and second recess near an opposite end. The first recess is located on one side of the member and the second recess is located on an opposite side of the member. The member also has a slot between the first recess and the second recess. The first recess of the member is aligned at one tube and the second recess of the member is aligned at another tube.

By using a plurality of connectors, according to the present invention, a series of tubes are aligned and clamped by placing the first recess of a first connector near a first tube. The second recess of a second connector is placed near the first tube on a side opposite of the first recess of the first connector; and the first recess of the second connector is placed near a second tube. The end near the first recess of the first connector is engaged with a slot of the second connector; and the end near the second recess of the second connector is located at the slot the first connector. In turn, the second recess of a third connector is placed near the second tube on a side opposite of the first recess of the second connector; and the end near the first recess of the second connector is engaged with the slot of the third connector. The end near the second recess of the third connector is located at the slot of the second connector. Finally, a weld is placed at the slot of the second connector for providing a welding at the end near the first recess of the first connector and the end near the second recess of the third connector.

The various features of novelty which characterize the invention are pointed out with particularity in the claims annexed to and forming a part of this disclosure.

For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 2:
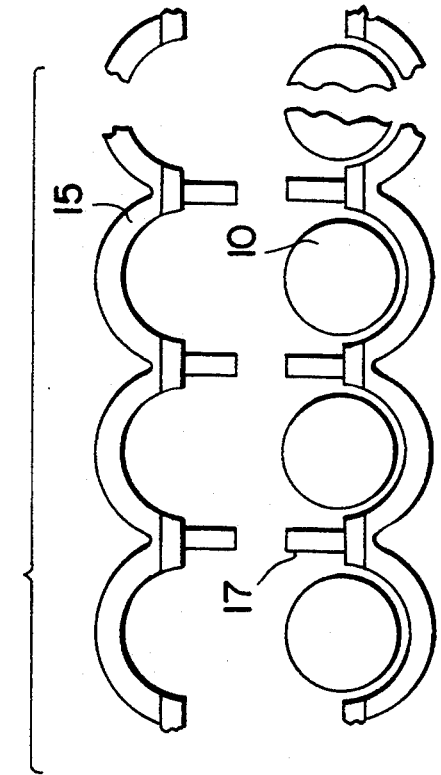
FIG. 2 is a view illustrating the connector of FIG. 1.
Figure 3:
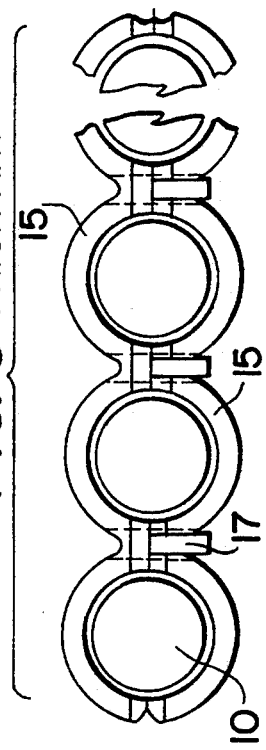
FIG. 3 is a view illustrating the known connector of FIG. 1 in a clamped position.
Figure 1:
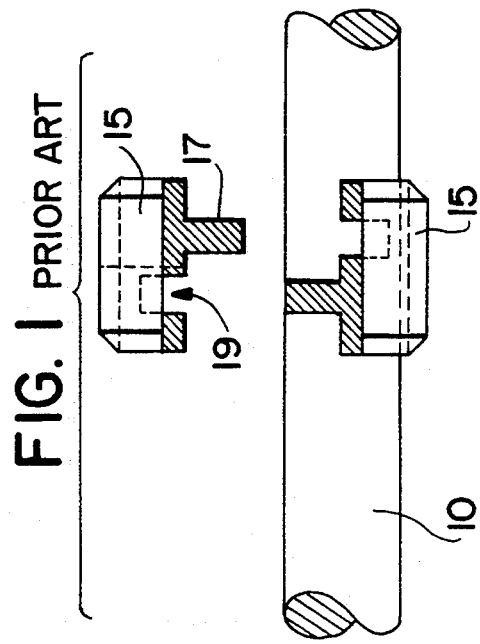
FIG. 1 is a view illustrating a section of a known connector.
Figure 4:
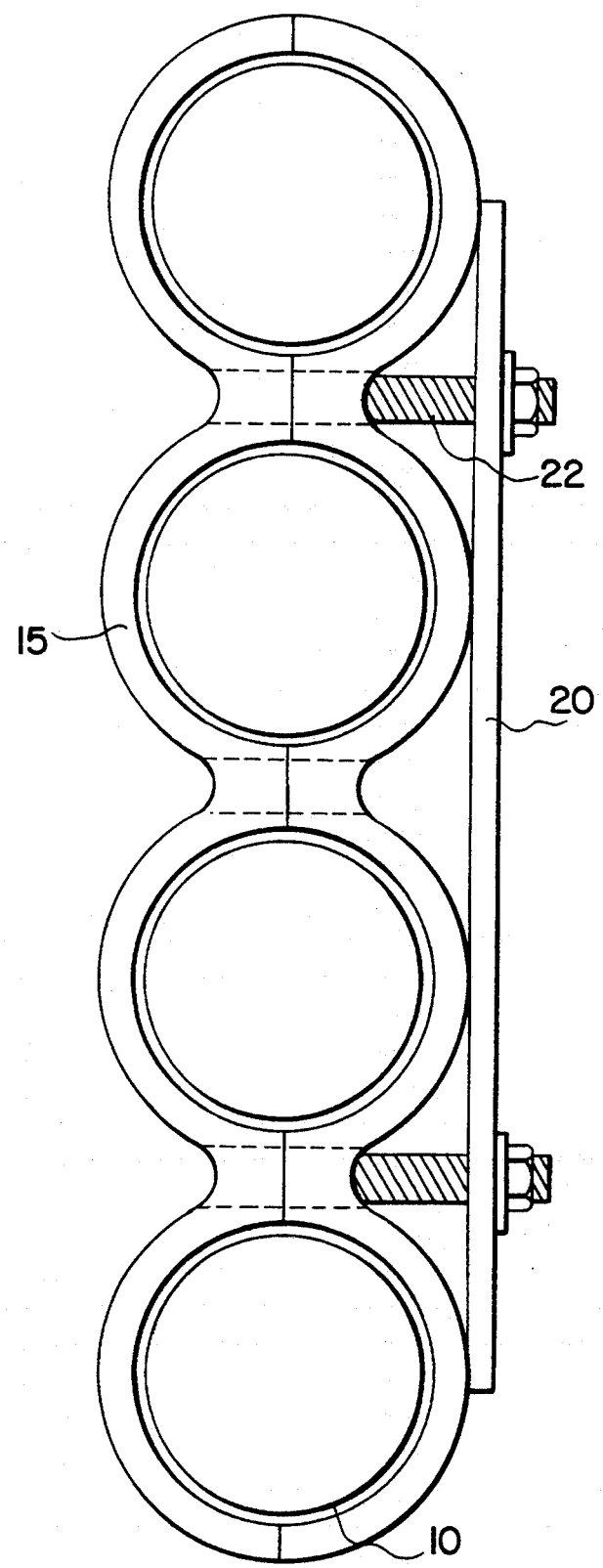
FIG. 4 is a view illustrating a second embodiment of a known connector.

FIG. 1 illustrates a known bar clamp for clamping a series of tubes 10 which comprises bar halves 15 having pins 17 and holes 19 in which the pin 17 of one bar half 15 is inserted into a hole 19 of a second bar half 15. FIG. 4 shows a second known device for clamping the tubes 10 having bolts 22 which are threaded through bar halves 15 and onto a backing plate 20 for securing the bar halves 15 around the tubes 10.

Figure 5:
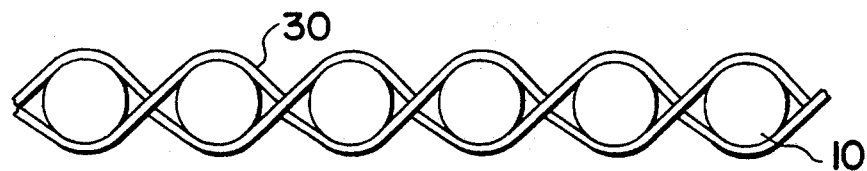
FIG. 5 is a top view of a clamping of a series of tubes according to the present invention.
Figure 6:
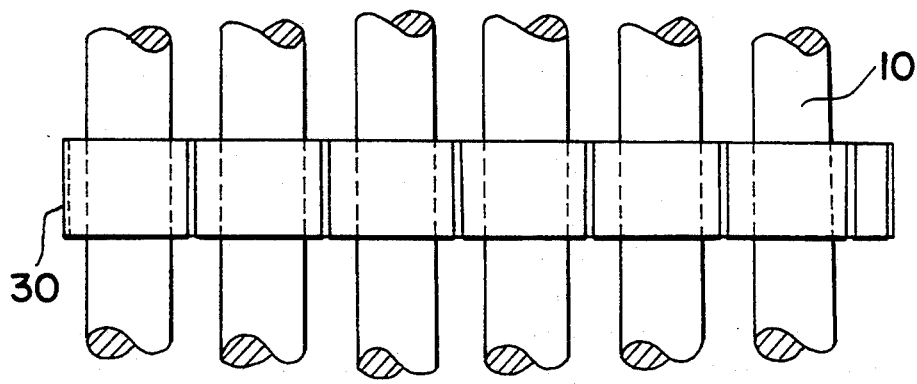
FIG. 6 is a side view of FIG. 5.

The present invention provides a device and method for clamping a plurality of tubes 10, in series, which is more efficient over the known devices. The present invention, as shown in FIGS. 5 and 6, use a plurality of connectors 30 which have an S-shaped configuration.

Figure 7:
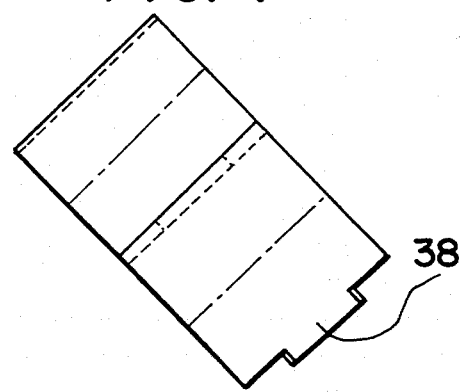
FIG. 7 is a view illustrating an end of a connector according to the present invention.
Figure 8:
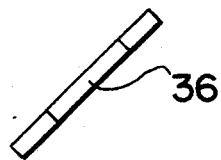
FIG. 8 is a view illustrating a slot of a connector according to the present invention.

As illustrated in FIGS. 9a, 9b, 9c and 9d, each S-connector 30 has an upper recess portion 32 and a lower recess portion 34. A slot 36 is provided on each S-connector 30 between the upper recess portion 32 and the lower recess portion 34. Moreover, the upper recess portion 32 is formed on a side opposite of the lower recess portion 34, thus giving the connector 30 its S-shaped configuration. Each connector 30 has at least one tongue 38 (FIG. 7) located at one end of the connector 30. The tongue 38 is insertable into the slot 36 (FIG. 8) of another connector 30.

As shown in FIGS. 9a, 9b, 9c and 9d, a first connector 30 is aligned such that the upper recess portion 32 is located at a first tube 10. A second connector 30 is aligned at the first tube 10 such that the lower recess portion 34 of the second connector 30 is positioned around the tube 10 opposite the upper recess portion 32 of the first connector 30. The tongue 38 of the first connector 30 is inserted into the slot 36 of the second connector 30 while the end near the lower recess portion 34 of the second connector is located near the slot 36 of the first connector. Additionally, the second connector 30 is aligned such that its upper recess portion 32 is aligned around a second tube 10.

Figure 9A:
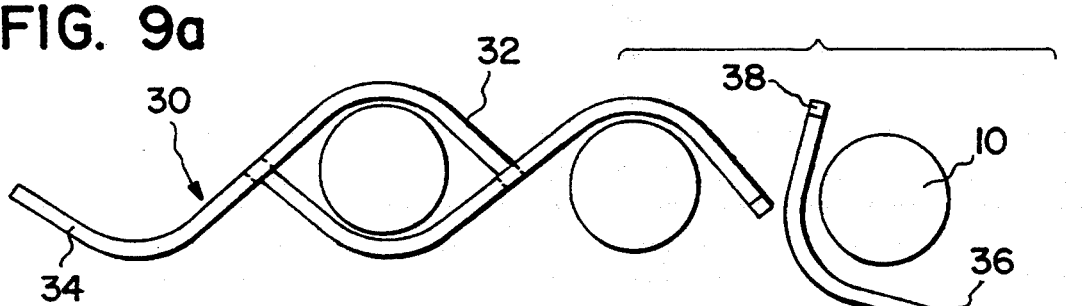
FIGS. 9a, 9b, 9c, and 9d are views illustrating the alignment and clamping of a series of tubes using the present invention.
Figure 9B:
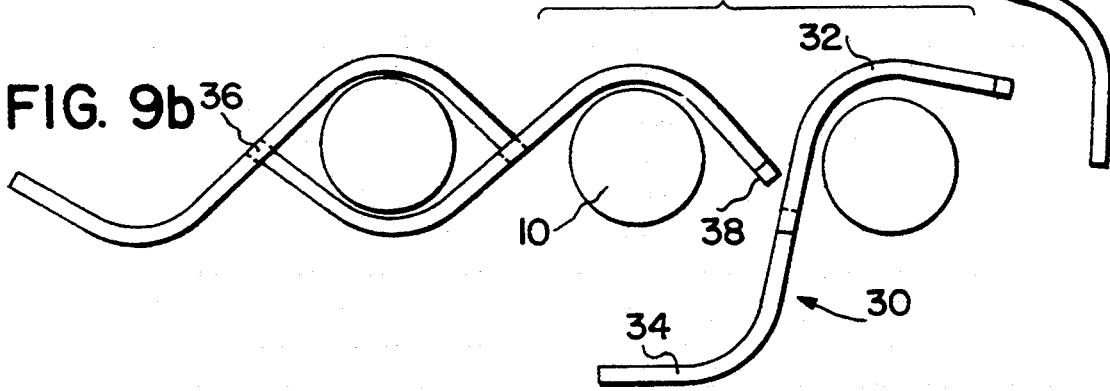
Figure 9C:
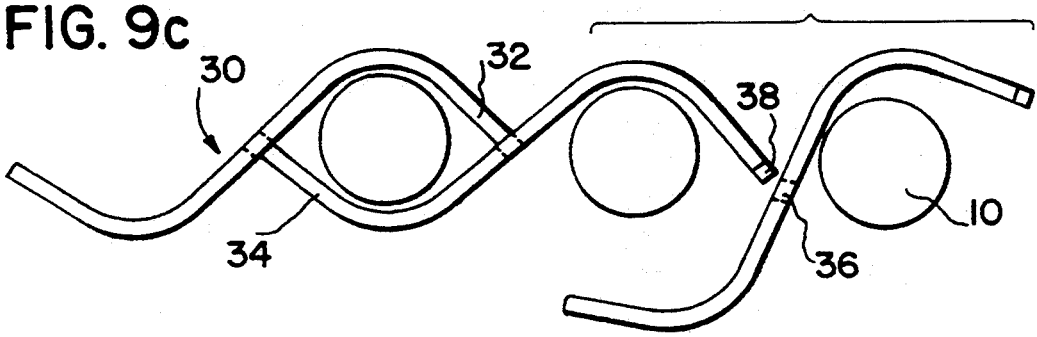
Figure 9D:
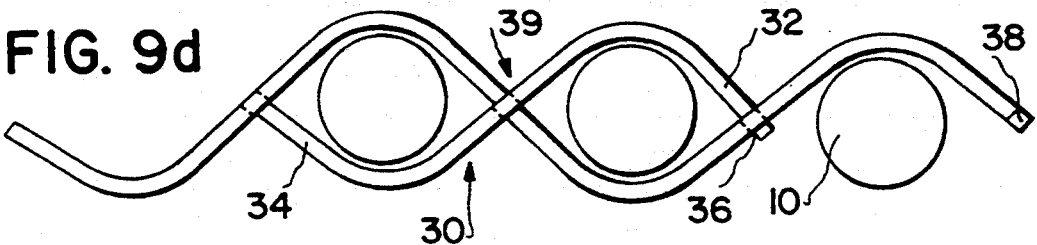

A third connector 30 is aligned between the second and third tubes 10 such that the lower recess portion 34 of the third connector 30 is aligned around the second tube 10 opposite the upper recess portion 32 of the second connector 30. The tongue 38 of the second connector 30 is inserted into the slot 36 of the third connector 30. The end near the lower recess portion 34 of the third connector 30 is positioned near the slot 36 of the second connector 30. Additionally, the upper recess portion 32 of the third connector 30 is positioned near a third tube 10 which will lie opposite a fourth connector 30 (not shown). As illustrated in FIG. 9d, a weld 39 is provided at the slot 36 of the second connector 30 for securing the end near the upper recess portion 32 of the first connector 30 to the slot 36 of the second connector 30 and the end near the lower recess portion 34 of the third connector 30. Thus, one weld 39 secures three separate connectors 30 in position around three tubes 10.

The present invention provides a connector for a plurality of tubes 10 which limits the movement and vibration of the tubes 10 and maintains the spacing of the tubes 10. After welding, the connectors 30 form a relatively rigid continuous tie about the tubes 10. The connectors 30 aligned around the tubes 10 are spaced approximately 1/32 inches from each tube 10, thus providing an annular clearance around tube 10 which is tight enough to promote effective heat transfer but is sufficient for providing an easy installation.

Because the present invention uses no pins, bolts or backing plates, as commonly found in the known devices, the present invention is less costly than the known devices. Because of the simplicity of the present invention, the present invention fits various depths for the tube banks 10.

While specific embodiments of the invention have been shown and described in detail to illustrate the application of the principles of the invention, it will be understood that the invention may be embodied otherwise without departing from such principles.

What is claimed is:

1. A connector for use in series for aligning and clamping a series of tubes, the connector comprising:
   a member having a first recess near one end and a second recess near an opposite end, the first recess being located on one side of the member and the second recess being located on an opposite side of the member, the member also having a slot between the first recess and the second recess, the first recess for receiving one tube and the second recess for receiving another tube; and
   a tongue on at least one end of the member, the tongue being engageable with the slot of an adjacent identical connector.

2. The connector according to claim 1, wherein the member comprises a substantially S-shaped configuration.

* * * * *